Dec. 16, 1924.
J. E. DAVIS
1,519,605
FILM METER FOR MOTION PICTURE APPARATUS
Filed Sept. 15, 1921
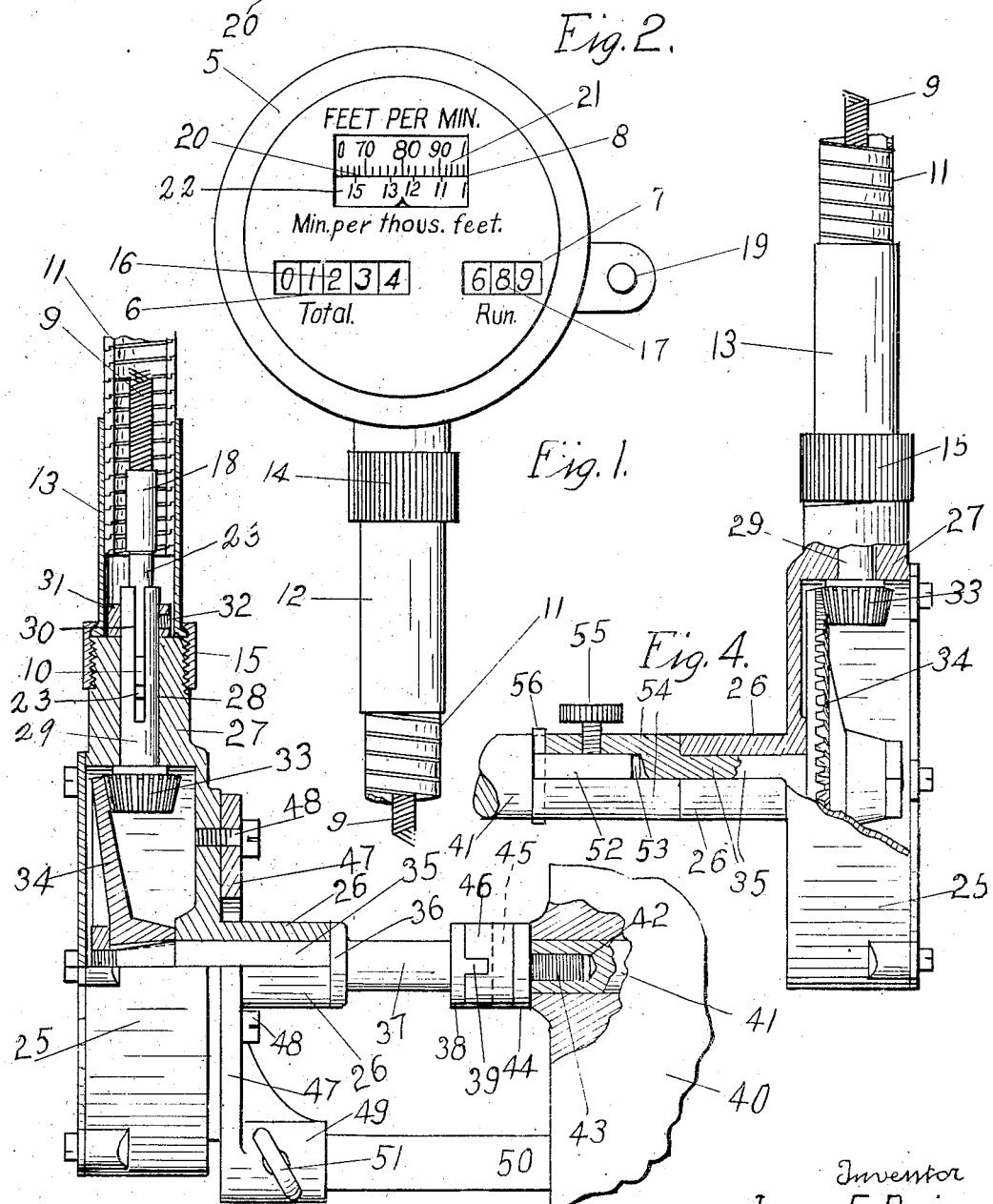

Patented Dec. 16, 1924.

1,519,605

UNITED STATES PATENT OFFICE.

JAMES E. DAVIS, OF DENVER, COLORADO.

FILM METER FOR MOTION-PICTURE APPARATUS.

Application filed September 15, 1921. Serial No. 500,871.

*To all whom it may concern:*

Be it known that I, JAMES E. DAVIS, a citizen of the United States, residing at the city and county of Denver and State of Colorado, have invented certain new and useful Improvements in Film Meters for Motion-Picture Apparatus, of which the following is a specification.

This invention embodies improvements in travel measuring mechanism for the more or less lengthy film strips employed with certain types of machines in the art of animated photography, and the invention may appropriately be referred to by the shorter title of film meters for motion picture apparatus.

While, for the sake of simplicity of illustration and brevity in description, the improvements will be more particularly disclosed with reference to motion picture projection machines, it is nevertheless to be distinctly understood at the outset that the invention is also equally applicable for use with the continuous film cameras employed in initially preparing the film lengths with serial photographic impressions, and likewise with the printing machines for the multiple reproduction of the original developed and finished film, all of which apparatus in this art should be under proper control with reference to regulating the travel of the film under varying conditions.

There are many important reasons for such regulable control, well understood by those engaged in the industry, but for the purpose of a better general understanding of the utility of the present improvements, it may not be amiss to briefly refer to a few interesting features as follows:—

In using motion picture cameras, the artist must be governed by many things, including such factors as prevailing light conditions for the particular setting of the series being photographed, the requisite time for the intermittent exposures under those conditions, what length of the whole film strip is to be allowed for the setting being then photographed, how much time is to be allowed for running off that predetermined length, and the rate of travel at which the film strip must be advanced, or say the number of feet per minute that must be paid out, in equalization of or to compensate for such aforesaid conditions.

When operating the aforesaid printing machines, the speed of the conjoint travel of the finished film and its associated sensitized film strip should be advanced, retarded, or maintained constant, in accordance with the condition of the finished film from which the printing is being effected. For instance so many feet of the said finished film, representing an original exposure under certain conditions and for depicting a certain setting in the series, might be of greater density, or otherwise, as compared to its other portions or settings, and hence, when printing therefrom, the proper exposure time may be substantially variant for different portions of the whole length thereof.

In the operation of the projection machine, which to a certain extent my invention may even the more forcibly apply, the projector operative must likewise be governed by varying conditions and factors, some of which are very analogous to some of those set forth with reference to the camera man. For instance, he must accurately figure on the total time that he has for the presentation of a complete entertainment, including perhaps a feature picture, a comedy, current topics and events, and most likely interposed vocal and instrumental selections, the motion picture portion of which entertainment may involve a number of reels, each embodying one or more film strips of say approximately one-thousand feet lengths. To such ends, therefore, he must allot himself an appropriately prorated length of time for each reel, or perhaps for each film length where more than one length is continuously wound on the reel, or even perhaps for each setting or group of settings in the series, which prorated periods of time themselves may obviously vary substantially in point of the exactly desired speed of reproduction, largely dependent upon the nature of the scene or setting. In order to intelligently provide for all such contingencies, he must further estimate very closely on the rate of travel at which the film strip should be advanced during any and all periods, in the sense of speeding up or slowing down the same, and the necessary careful consideration of all of which aforementioned factors is well understood by those actively engaged in the production and reproduction ends of the motion picture industry.

Viewed from the aspect of these prefacing remarks, it will be understood that the primary object of the present invention has been to efficiently combine, in comparatively simple, durable and inexpensive measuring mechanism, automatically operative elements which provide for the continuous visual indication at any and all times of the variable rate of speed at which the film strip is traveling, including the distance traveled in a definite unit of time as well as the number of said units of time that it will take, at such indicated rate of speed, to pay off a predetermined length of film which I approximate at one-thousand feet as the standard lengths. It is obviously further desirable to continuously register the total amount of travel, say in thousand-feet lengths, of the films which have been successively passed through the machine, as a permanently registering feature, and likewise to temporarily register a trip-total or sub-total of individual runs, all of which features are provided for by my improved mechanism.

Having thus given a general outline of the desired ends to be attained, it is believed that the foregoing features and other objects and advantages will be so clearly apparent, as incidental to the following disclosure, that it would serve no useful purpose to further enlarge on the same initially, and reference will now be had to the accompanying drawings, therefore, for a clearer conception of the improvements as more succinctly set forth in the appended claims, in which drawings—

Figure 1 is a face elevational view of the indicating and registering device, which is substantially analogous to any suitable form of odometer of the trip-and-total type, but which is slightly altered, although materially so, in its adaptation to my invention as a newly functioning mechanism in the motion picture art; Figure 2 is a plan view of my specially graduated scale indicator strip, which is carried by the usual annularly oscillating support of the aforesaid types of odometers; Figure 3 is a fragmentary view, partly in elevation and partly in vertical section, looking towards one edge face of my attachment as associated with the left-hand side of a motion picture projecting machine, and including the connected inner ends of the flexible shafting, and its casing, leading to the indicating and registering device; and Figure 4 is a view of the attachment, somewhat analogous to Figure 3, but for association with the right hand or driving side of the machine.

5 generally designates a register-indicator device, of the well known Stewart-Warner "speedometer" type although slightly altered, providing the usual sighting windows or slot openings 6, 7 and 8, the flexible shafting 9, the flexible tubular casing 11 therefor, the terminal coupling sleeves 12—13 and their couplings 14—15 for the flexible casing, the totaling register wheels 16 associated with the window 6, the sub-totaling or run register wheels 17 associated with the window 7, and the tripping lever 19 for resetting the sub-totaling wheels 17 back to zero as desired. The lower end of the flexible shafting 9 is fitted into a socketed head 18 of a plug terminal element 23, which latter provides a laterally projected keying lug 10 towards its lower end.

This type of device also provides a rotatably mounted magnet element, revolubly actuated by proper means associated with said flexible shafting 9, the magnet element being freely encompassed by an indicating band support that is annularly oscillated, in a flotatable manner and with variant degrees of motion, by the magnetic pull of the aforesaid revolving magnet element, which latter is itself actuated at a variable speed, dependent upon the speed of rotation of said flexible shafting 9 and its connected register wheels, with which the said revolving magnet element is also coupled up.

While the specific features set forth in the immediately preceding paragraph have not actually been illustrated, although they are inferentially included by the illustration of an indicating scale band as associated with the sighting window 8, yet they are all well understood from the construction of the aforesaid extensively known and marketed Stewart-Warner devices, and as I aim to employ such an analogous device in its general arrangements, that is to say such a one as slightly although materially altered as will hereinafter appear, it is not believed to be necessary to encumber the drawings with additional views to specifically show all of these well understood internal details of such devices.

In the aforesaid type of device as altered by me, an indicator band or strip is carried by any such equivalent oscillating support that is associated with the window 8, which indicator band may preferably be of proper dimensions to peripherally encompass the aforesaid annularly oscillating band support, and the said indicator band provides a longitudinally divided scale zone, the suitably graduated scale of which is indicated by the transversely disposed lines 20. While the scale zone may have a single series of lines 20, as shown, it does in fact provide a dually functioning upper and lower scale division, with proper numerals for respectively indicating the length of film paid out, in a definite unit of time, and the number of said time units which will elapse, at such indicated rate of speed, in paying off a predetermined length of the film, and both of which measurements should be determinable at a single glance by the busily employed operative.

Obviously, the said scale divisions might be reversed with reference to their upper and lower dispositions as actually shown in the drawings, also any suitable definite unit of time would be acceptable, and any preferred form of measurement, other than feet, could be employed, but for all practical purposes I shall simply refer to a full "minute" as the definite unit of time and the "feet" as the form of linear measurement.

To this end, therefore, the rate of travel of the film in Feet per minute, as captioned, is visually indicated by the upper scale or strip division 21, while the lower scale or strip division 22 is captioned as Minutes per thousand feet, and visually indicates the number of minutes it will take to run off a thousand feet of film, at such rate of speed as indicated by the upper division 21, a thousand feet being the approximate standard length of each separate film strip. For instance, as illustrated at Figure 1, the film is traveling at the rate of eighty feet per minute, and at that rate it will take approximately twelve and one-half minutes to run off one-thousand feet or the normal film length, all of which it is highly desirable to ascertain at a glance and without any calculation.

At the lower left of the register and indicator, the term "Total" is intended to represent the total length of films successively run through the machine in lengths of one-thousand feet each, and as shown registered in the drawings this total would represent 1,234,000 linear feet, or 1,234 lengths of one thousand feet each. Analogously, the term "Run" at the lower right is intended to represent a sub-total, or individual run or runs, in divisions of ten feet, and as shown registered by the drawings this sub-total or run would represent 6,890 linear feet or 689 divisions of ten feet each. If it is desired to more clearly visualize these readings in linear feet, instead of in divisions of a thousand feet and ten feet as illustrated, this can easily be arranged for by supplying three dummy ciphers and one dummy cipher, respectively, immediately following the right ends of the slot openings 6 and 7, as will be clearly understood and which it is my intention to do in extended practice.

In the foregoing I have mainly referred to the great utility of my real improvements in the motion picture art, and while I have also referred specifically to certain important features of the register-indicator as employed by me, for the purpose of emphasizing the adaptation of my primary improvements broadly and specifically, it nevertheless has never been my intention to make any claims, in this present application at least, to any improvements on a register-indicator or on a motion picture machine, although I may properly and preferably do predicate my improvements by a prefacing reference to both a motion picture device and an odometer of some kind.

It may also be stated that it is not my intention to simply attach a speed indicator directly to a motion picture machine, because in that event and where a plurality of machines are conjointly employed, as they necessarily are in the larger motion picture houses and even in the smaller ones, it is obvious that the operator would have to be continually running back and forth around his machines to ascertain from each indicator how its machine was running.

On the other hand, what I have aimed to do, and have in fact very successfully accomplished, has been to devise an improved device or attachment, which is operatively associated with motion picture machine and also provides a coupling attachment for connection with the register-indicator at a position distant from its machine, whereby the exact functioning of any one or more of the machines may be under constant observation at a common position distant from all machines.

When considered at least from the viewpoint of motion picture projectors or operators, who are kept extremely busy in many relations other than the mere watching of their machines, the advantageous distinctions and advantages of the arrangement last described will be readily discernible, and with these further explanatory remarks, I will now enter more fully into the details of construction of my improved intermediate coupling device.

25 designates an annular casing, providing an axial journal bearing 26 and a radial journal bearing in the nature of a peripheral boss 27 that provides an axial bore 28 to journal a hollow spindle 29, which latter has a longitudinal slot 30 for receiving the lateral keying lug 10, it being understood that the terminal plug 23, of the flexible shaft 9, fits into the hollow spindle 29 with a longitudinal play.

The upper end of the spindle 29 is provided with a bearing collar 31, secured thereto by the set screw 32, and the lower end of said spindle carries a pinion 33 that meshes with a gear wheel 34, both said gear wheel and said pinion being disposed within said casing 25, and the teeth of which are formed in proper ratio for the ends desired. Of course, gearing of other types than the bevel gearing shown could be employed, but the arrangement illustrated has proven to be a very compact and satisfactory one.

The gear wheel 34 is carried by one end of a shaft 35 which is journaled by the axially disposed bearing 26 and, as shown at Figure 3, the said shaft may have an annular shoulder 36 providing a reduced shaft continuation 37 that may have a terminal coupling disk 38 providing a coupling tongue 39 disposed diagonally of its flat outer face. In this view, 40 designates the left hand side of the motion picture projecting machine while 41 indicates the left hand end of what we may call its main shaft, as it is the crank or driving shaft thereof.

When my attachment is applied to this left hand side of the projection machine, the flush end of the driving shaft 41 may be axially bored, as at 42, and threaded to receive a stud screw 43, the head 44 of which provides a coupling tongue 45 disposed diagonally of the flat outer face thereof.

46 indicates an intermediate coupling disk, which may be formed of hard fibre or otherwise, and this intermediate disk provides a groove on each of its flat outer faces, which grooves are diagonally disposed at right angles to each other to receive the tongues 39 and 45 with the freedom of slight play, and thus making the coupling more or less flexible to that extent.

47 designates a bracket plate that is secured to and rigidly supports the gear casing 25, as by means of the head screws 48, and the lower end of this bracket provides a lateral attaching sleeve 49 for encompassing association with a stud arm 50 that is mounted by the projection machine 40 adjacent to the shaft 41. It is believed to be obvious, however, that it would be an equivalent and perhaps more expedient structure to form the sleeve 49 as an integrally cast part of the gear casing proper, analogously to the integral casting therewith of the journal bearings 26 and 27. 51 is a thumb screw for detachably securing the sleeve 49, with its bracket arm 47 and gear casing 25, in proper adjustable association with the arm 50 of the projecting machine. It is to be understood that this arm 50 is projected from the motion picture machine as its support, being disposed in parallel relation to the shaft 41, and that the sleeve 49 and journal bearing 26, therefore, are likewise complementally disposed for respective alignment therewith.

The coupling arrangement shown at Figure 4 is substantially similar to that of Figure 3, excepting that slight alterations are made to accommodate the mounting of the gear casing 25 at the right hand end of the driving shaft 41, which in this instance projects beyond the right hand side of the projecting machine. Practically all standard machines are now driven by motor power, but this end of the shaft still provides a reduced extension 52 for the application of a hand crank if the emergency arises.

In applying my attachment at this right hand side of the projecting machine, therefore, I may form the gear wheel shaft 35 with a head 54 that is axially bored, as at 53, to fit over the reduced extension 52 of the driving shaft 41. The head 54 has a threaded aperture to receive a set screw 55, and there may also be provided a keying pin 56 which passes through diametrically opposite end slots in the head 54 and through a complementary drill hole formed in the reduced extension 52 of the driving shaft.

Although I have heretofore referred to the coupling up of the gear wheel shaft 35 of my attachment to the main or driving shaft 41 of the motion picture machine, it will be understood that this is not a matter of real necessity but simply one of expediency, not only because it is perhaps the most convenient shaft to couple up to but also for the reason that, in practically all standard machines, the ratio of gearing is such that with one revolution of the main shaft there is paid out one foot of film, and it is a very easy matter to determine the appropriate ratio of the intermediate gearing 33—34 with reference to the motion picture machine and the register-indicator. However, and if ever found desirable, it is obvious that the gear shaft 35 could be coupled up with any suitable shaft of the motion picture machine other than the preferred main shaft 41, but then of course the ratio of the gearing 33—34 would have to be altered accordingly.

From the foregoing complete description it is believed that the advantages, the novel combination of elements and functioning of the improvements will be clearly apparent, but while I have thus disclosed the invention it may later be found to be desirable or expedient to make some alterations in the structural form and arrangement of the parts, without in fact departing from the spirit of the invention, and it will be understood, therefore, that I do not wish to restrict myself to all of the details exactly as disclosed, excepting as they may come within the terms of the ensuing claims, or as when fairly interpreted in the light of the specification if necessary, or equivalent features.

What I do claim as new and patentable is:—

1. In film meter connections, the combination of a closed casing provided with a radial and an axial journal bearing opening thereto, a pinion shaft journaled in said radial bearing, its outer end being adapted for connection to the flexible shafting of a distantly located indicator metering device, a gear shaft journaled in said axial bearing, its outer end being provided with a coupling member, a pinion and a gear wheel housed, in mesh, within said casing on the inner ends, respectively, of said pinion and gear shafts, a coupling member for connection with a shaft of a motion picture machine, means for adjustably attaching said casing to said machine, with said gear shaft in substantial endwise alignment with said machine shaft, and a third coupling member interposed between the aforesaid coupling members.

2. In film meter connections, the combination of a closed casing provided with a radial and an axial journal bearing opening thereto, a pinion shaft journaled in said radial bearing, its outer end being adapted for connection to the flexible shafting of a distantly located indicator metering device, a gear shaft journaled in said axial bearing, its outer end being provided with a coupling member having tonguing means thereon, a pinion and a gear wheel housed, in mesh, within said casing on the inner ends, respectively, of said pinion and gear shafts, a second coupling member for connection with a shaft of a motion picture machine and being also provided with tonguing means, means for adjustably attaching said casing to said machine, with said gear shaft in substantial endwise alignment with said machine shaft, and a third coupling member interposed between the aforesaid coupling members and being slotted to receive said tonguing means in angularly disposed positions relatively to each other.

3. In film meter connections, the combination of a closed casing provided with a radial and an axial journal bearing, opening thereto, and a lateral sleeve disposed in suitably spaced association with said axial bearing, a pinion shaft journaled in said radial bearing, its outer end being adapted for connection to the flexible shafting of a distantly located indicator metering device, a gear shaft journaled in said axial bearing and adapted at its outer end to be coupled to a shaft of a motion picture machine, that has an arm support disposed parallel to said machine shaft, with said lateral sleeve adjustably encompassing said arm support, and a pinion and a gear wheel housed, in mesh, within said casing on the inner ends, respectively, of said pinion and gear shafts.

4. In film meter connections, the combination of a closed casing provided with a radial and an axial journal bearing, opening thereto, and with a lateral sleeve disposed in suitable spaced association with said axial bearing, a pinion shaft journaled in said radial bearing, its outer end being adapted for connection to the flexible shafting of a distantly located indicator metering device, a gear shaft journaled in said axial bearing, its outer end being provided with a coupling member having tonguing means thereon, a pinion and a gear wheel housed, in mesh, within said casing on the inner ends, respectively, of said pinion and gear shafts, a second coupling member for connection with a shaft of a motion picture machine and being also provided with tonguing means, the said machine having an arm support, disposed parallel to said machine shaft, which arm support is adapted to be adjustably encompassed by said lateral sleeve, for rigidly attaching said casing to said machine, and a third coupling member interposed between the aforesaid coupling members and being slotted to receive said tonguing means in angularly disposed positions relatively to each other.

In testimony whereof, I affix my signature.

JAMES E. DAVIS.